United States Patent
Park et al.

(10) Patent No.: US 7,428,232 B2
(45) Date of Patent: Sep. 23, 2008

(54) BROADCAST METHOD IN WIRELESS NETWORK AND COMMUNICATION APPARATUS USING THE SAME

(75) Inventors: Jong-hun Park, Suwon-si (KR); Myung-jong Lee, New York, NY (US); Chun-hui Zhu, New York, NY (US)

(73) Assignees: Samsung Electronics Co., Ltd., Suwon-si (KR); City Univerity of New York, New York, NY (US)

( * ) Notice: Subject to any disclaimer, the term of this patent is extended or adjusted under 35 U.S.C. 154(b) by 668 days.

(21) Appl. No.: 11/038,424

(22) Filed: Jan. 21, 2005

(65) Prior Publication Data
US 2005/0180399 A1 Aug. 18, 2005

Related U.S. Application Data

(60) Provisional application No. 60/544,226, filed on Feb. 13, 2004.

(30) Foreign Application Priority Data

Oct. 21, 2004 (KR) .................. 10-2004-0084309

(51) Int. Cl.
*H04L 12/54* (2006.01)
*H04J 3/24* (2006.01)
*H04Q 7/20* (2006.01)

(52) U.S. Cl. .................. 370/349; 370/390; 370/428; 370/432; 455/445

(58) Field of Classification Search .................. 370/349, 370/390, 428, 432; 455/445
See application file for complete search history.

(56) References Cited

U.S. PATENT DOCUMENTS 4,939,726 A * 7/1990 Flammer et al. ............ 370/400

(Continued)

FOREIGN PATENT DOCUMENTS

EP 1 107 508 A1 6/2001

(Continued)

OTHER PUBLICATIONS

Yu-Chee Tseng, et al., "Adaptive Approaches to Relieving Broadcast Storms in a Wireless Multihop Mobile Ad Hoc Network", IEEE Transactions on Computers, May 2003, pp. 545-557, vol. 52, No. 5.

(Continued)

*Primary Examiner*—Alpus H Hsu
(74) *Attorney, Agent, or Firm*—Sughrue Mion, PLLC

(57) ABSTRACT

A broadcast method in a wireless network and a communication apparatus using the same. The broadcast method determines whether the broadcast packet is first received upon receiving a broadcast packet. If a determination reveals that the packet is first received, the broadcast packet is stored and rebroadcast to neighbor nodes. Subsequently, a node, among the neighbor nodes, from which the broadcast packet is received, is marked as 'relayed'. The broadcast packet is rebroadcast when all of the neighbor nodes from which the broadcast packet is received are not marked as 'relayed'. When all of the neighbor nodes from which the broadcast packet is received are marked as 'relayed', the broadcast packet is destroyed. Accordingly, an efficient link-based broadcast method is provided.

18 Claims, 7 Drawing Sheets

U.S. PATENT DOCUMENTS

| | | | | |
|---|---|---|---|---|
| 5,007,052 | A | * | 4/1991 | Flammer ..................... 370/389 |
| 5,056,085 | A | * | 10/1991 | Vu ............................. 370/400 |
| 5,115,433 | A | * | 5/1992 | Baran et al. ................. 370/400 |
| 6,594,272 | B1 | * | 7/2003 | Ketcham et al. ............ 370/428 |
| 6,965,575 | B2 | * | 11/2005 | Srikrishna et al. ........... 370/252 |
| 7,069,483 | B2 | * | 6/2006 | Gillies et al. ................ 714/712 |
| 7,369,512 | B1 | * | 5/2008 | Shurbanov et al. .......... 370/254 |
| 2003/0163554 | A1 | * | 8/2003 | Sendrowicz ................ 709/220 |
| 2004/0117513 | A1 | * | 6/2004 | Scott ............................ 710/1 |
| 2005/0094576 | A1 | * | 5/2005 | Fonseca et al. .............. 370/255 |

FOREIGN PATENT DOCUMENTS

| | | |
|---|---|---|
| JP | 8-97821 A | 4/1996 |
| JP | 2001-16264 A | 1/2001 |
| JP | 2003-8591 A | 1/2003 |

OTHER PUBLICATIONS

Brad Williams, et al., "Comparison of Broadcasting Techniques for Mobile Ad Hoc Networks", Proceedings of the 3rd. ACM International Symposium on Mobile Ad Hoc Networking and Computing, Jun. 9, 2002, pp. 194-205.

Sze-Yao Ni, et al., "The Broadcast Storm Problem in a Mobile Ad Hoc Network", Proceedings of the 5th Annual ACM/IEEE International Conference on Mobile Computing and Networking, Aug. 15, 1999, pp. 151-162.

Chunhui Zhu, et al., "A Border-aware Broadcast Scheme for Wireless Ad Hoc Network", Consumer Communications and Networking Conference, Jan. 5, 2004, pp. 134-139.

S. Alagar, et al., "Reliable Broadcast in Mobile Wireless Networks", Military Communications Conference, Nov. 1995, pp. 236-240, vol. 1.

"IEEE Standard for Information Technology Part 15.4: Wireless Medium Access Control (MAC) and Physical Layer (PHY) Specifications for Low-Rate Wireless Personal Area Networks (LR-WPANSs)", The Institute of Electrical and Electronics Engineers, Inc., Oct. 2003, pp. 13-15, pp. 54.

K. Tang et al., "Mac Reliable Broadcast in AD Hoc Networks", IEEE Military Communications Conference, Oct. 2001, pp. 1008-1013, vol. 1.

* cited by examiner

FIG. 6

| ID | RELAYED MARK FIELD |
|----|--------------------|
| 2  | √                  |
| 4  | √                  |
| 5  | √                  |
| 6  |                    |
| 7  |                    |
| 9  |                    |

BROADCAST METHOD IN WIRELESS NETWORK AND COMMUNICATION APPARATUS USING THE SAME

CROSS-REFERENCE TO RELATED APPLICATIONS

This application claims the priority of Korean Patent Application No. 2004-84309 filed on Oct. 21, 2004 in the Korean Intellectual Property Office and U.S. Provisional Patent Application No. 60/544,226 filed on Feb. 13, 2004 in the United States Patent and Trademark Office, the disclosures of which are incorporated herein by reference.

BACKGROUND OF THE INVENTION

1. Field of the Invention

The present invention generally relates to a broadcast method in a wireless network and a communication apparatus using the broadcast method. More particularly, the present invention relates to a broadcast method in a wireless network and a communication apparatus using the broadcast method, which are capable of efficiently broadcasting data by a link-based broadcast in a ZigBee network compliant to the IEEE 802.15.4 standard.

2. Description of the Related Art

In contrast to a Local Area Network (LAN) or a Wide Area Network (WAN), a Personal Area Network (PAN) is a network owned by an individual. Devices owned by the individual are interconnected to construct a network in order to provide convenience for the owner. The Institute of Electrical and Electronics Engineers, Inc. (IEEE) 802.15 Working Group developed the WPAN for short distance wireless networks to standardize and implement the PAN. The IEEE 802.15 standard has four Task Groups. More particularly, IEEE 802.15.1 standardizes the well-known Bluetooth technology, whereas IEEE 802.15.3 and IEEE 802.15.3a standardizes the high rate WPAN. Additionally, IEEE 802.15.4, alias ZigBee, standardizes low rate WPAN which corresponds to data rates less than 250 kbps.

One of the goals of ZigBee is to standardize the protocol stacks above a media access control (MAC) layer for wireless sensor networks. To this end, the current ZigBee specification supports reliable data broadcast at a network layer. A broadcast method specified in the ZigBee specification consists of three major parts, which include a network-wide broadcast, a local broadcast repair, and a limited radius broadcast.

FIGS. 1 through 4 illustrate conventional broadcast methods according to the ZigBee specification. Referring now to FIGS. 1 through 4, the conventional broadcast methods of the ZigBee specification and drawbacks associated with the conventional broadcast methods are described below.

FIG. 1 illustrates the network-wide broadcast mechanism in the ZigBee network which is specified in the ZigBee specification. According to the ZigBee specification, the network-wide broadcast mechanism is a tree-based broadcast in which broadcast packets are only forwarded via a tree structure.

For example, if the source of a broadcast packet is a node A in a network as shown in FIG. 1, the broadcast packet must be transmitted through its parent node in order to reach neighbor nodes because the broadcast packet is delivered only following the tree structure. Thus, transmission of the broadcast packet from node A to node B or node C, as shown in FIG. 1, requires six transmissions and relays following the tree structure. However, by utilizing physical links instead of the tree structure, the broadcast packet can be delivered to node B or node C (of FIG. 1) via three or four nodes along links indicated as dotted lines in FIG. 1. Therefore, the transmission of the broadcast packets following the tree structure according to the ZigBee specification delays the delivery of the broadcast packets unnecessarily.

FIG. 2 illustrates the local broadcast repair mechanism in the ZigBee network. As explained above, the broadcast method of the ZigBee specification utilizes a parent and child relationship based on the three structure. If a node loses contact with its parent node, a broadcast packet is not delivered farther. The local broadcast repair mechanism is used to repair the lost link in such a situation.

The ZigBee specification specifies that a child node, which loses contact with its parent node, performs a local broadcast repair using a 'Lost Parent' bit in a packet control field included in a packet header. However, there is no solution with respect to delivery of a broadcast packet from a parent node when the parent node loses contact with the child node. For example, if a link between node C and node B is broken, as shown in FIG. 2, node F can receive a packet from a node, such as node G, via another branch of node C. However, since the packet received from node G is not delivered from its parent or child node, the packet is discarded. As a result, the sub-tree under node B is not covered.

FIG. 3 illustrates the limited radius broadcast mechanism used in a ZigBee network. According to the limited radius broadcast mechanism, a range to which a broadcast packet reaches can be set using a radius counter (RC) value. Referring to FIG. 3, a node 0 performs the limited radius broadcast with RC=2. The RC value decreases by 1 every time the broadcast packet is retransmitted from each node. The broadcast packet is not retransmitted farther when the RC value becomes zero.

The limited radius broadcast, which allows the tree structure, may present undesired results. For example, as shown in FIG. 4, if nodes F and G are one-hop neighbor nodes and node F attempts to perform the limited radius broadcast with RC=3, the broadcast packet will not be delivered to the node G. In order to reach node G, the limited radius broadcast has to be performed with RC=4. That is, the RC value needs to be unnecessarily large to cover neighbor nodes, and therefore, unnecessary traffic increases.

SUMMARY OF THE INVENTION

To address the problems described above with respect to the conventional broadcast methods which correspond to the ZigBee specification, an aspect of the present invention provides a link-based broadcast method in a wireless network.

To achieve the above aspect of the present invention, the broadcast method in a wireless network comprises the steps of receiving a broadcast packet, determining whether the broadcast packet is first received, storing the broadcast packet and rebroadcasting the broadcast packet to neighbor nodes when the broadcast packet is first received, and destroying the broadcast packet when the broadcast packet is not first received. The wireless network is a ZigBee network compliant to the IEEE 802.15.4 standard.

The broadcast method further comprises marking a node, among the neighbor nodes, from which the broadcast packet is received as 'relayed', checking whether all of the neighbor nodes are marked as 'relayed' after a predetermined time, and rebroadcasting the broadcast packet when all of the neighbor nodes from which the broadcast packet is received are not marked as 'relayed'. The broadcast method further comprises the step of destroying the broadcast packet when all of the neighbor nodes from which the broadcast packet is received are marked as 'relayed'.

A rebroadcast timer counts the predetermined time, thereby setting a rebroadcast time. The predetermined time may be set based on a link quality indicator (LQI) value of the received broadcast packet.

The rebroadcast step is repeated a number of times corresponding to a predetermined value at intervals of the predetermined time until all of the neighbor nodes relay the broadcast packet. Thus, unrestricted rebroadcast is prevented.

The marking step sets a neighbor list corresponding to information relative to the neighbor nodes, and marks nodes listed in the neighbor list. The neighbor list is set using a bitmap based on an index of the listed neighbor nodes. The listed neighbor nodes are located within one hop from a broadcast source. The listed neighbor nodes are grouped based on a ZigBee address and the grouped neighbor nodes are checked to determine whether the grouped neighbor nodes are marked as 'relayed'.

Consistent with an aspect of the present invention, a broadcast method in a wireless network comprises receiving a broadcast packet, determining whether a designated field in a header of the broadcast packet is set, rebroadcasting the broadcast packet according to a reliable broadcast method when the designated field is not set, and rebroadcasting the broadcast packet according to an unreliable broadcast method when the designated field is set. The wireless network mentioned above is a ZigBee network compliant to the IEEE 802.15.4 standard.

The reliable broadcast method rebroadcasts the broadcast packet if the broadcast packet is first received, and rebroadcasts the broadcast packet after a predetermined time if there is a node, among the neighbor nodes, which does not relay the broadcast packet. If the packet is not first received, the reliable broadcast method destroys the broadcast packet. The unreliable broadcast method rebroadcasts the broadcast packet if the broadcast packet is first received, and destroys the broadcast packet if the broadcast packet is not first received.

The designated field is a 'Lost Parent' field in a packet control field included in the header of the broadcast packet.

Consistent with an aspect of the present invention, a communication apparatus using a broadcast method in a wireless network, comprises a means for receiving a broadcast packet, a means for determining whether the broadcast packet is first received, a means for storing and rebroadcasting the broadcast packet to neighbor nodes if the broadcast packet is first received, and a means for destroying the broadcast packet if the broadcast packet is not first received.

The communication method further comprises a means for marking a node, among the neighbor nodes, from which the broadcast packet is received, as 'relayed', a means for checking whether all of the neighbor nodes are marked as 'relayed' after a predetermined time, and a means for rebroadcasting the broadcast packet if all of the neighbor nodes are not marked as 'relayed'. The communication apparatus further comprises a means for destroying the broadcast packet if all of the neighbor nodes are marked as 'relayed'.

BRIEF DESCRIPTION OF THE FIGURES

These and/or other aspects and advantages of the invention will become apparent and more readily appreciated from the following description of the exemplary embodiments, taken in conjunction with the accompanying drawing figures of which:

FIG. 6 is a diagram of an exemplary embodiment of a neighbor list;

DETAILED DESCRIPTION OF THE EMBODIMENTS

Figure 1:
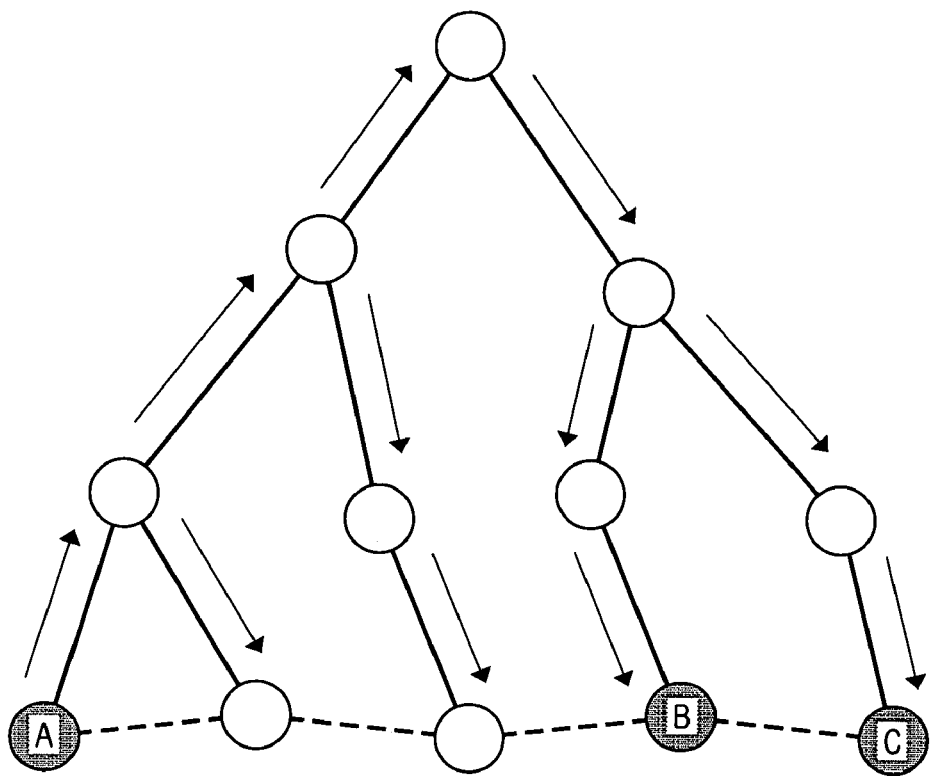
FIGS. 1 through 4 are diagrams of conventional broadcast methods according to a ZigBee specification.
Figure 2:
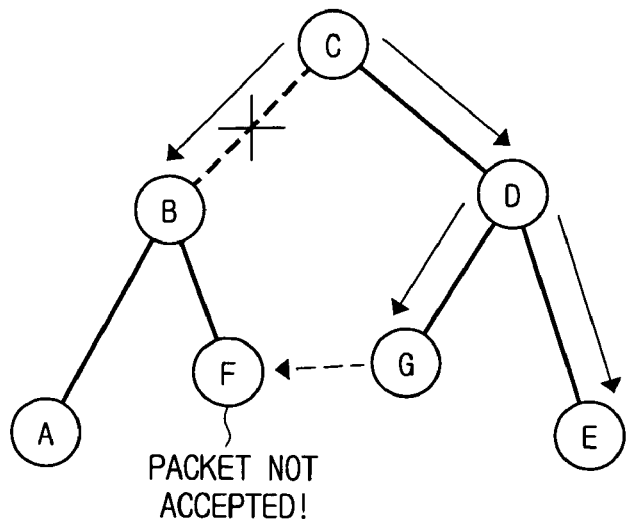
Figure 3:
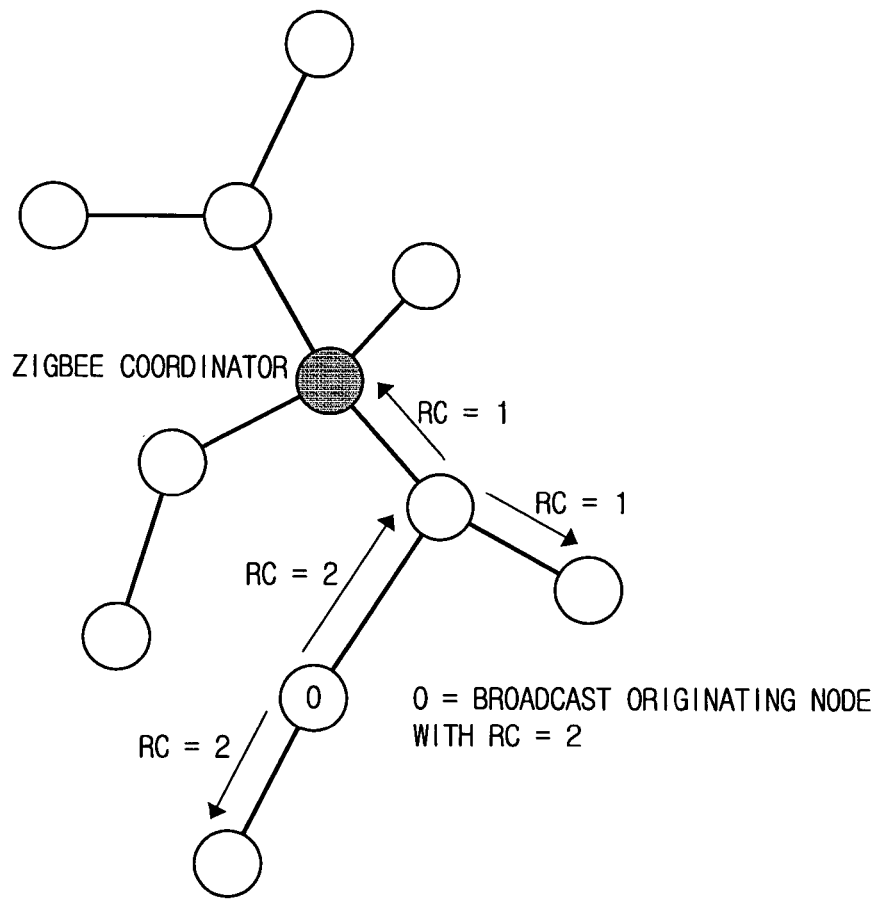
Figure 4:
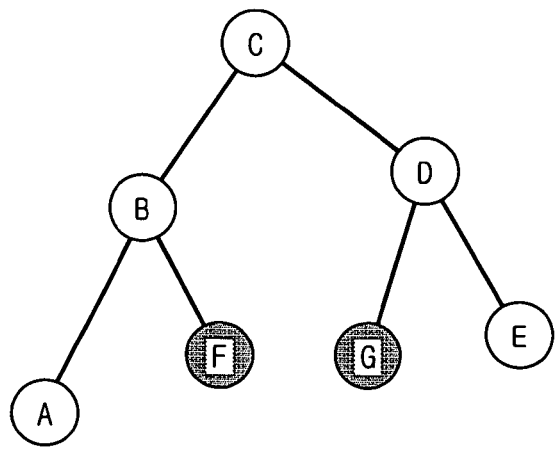

Reference will now be made in detail to the exemplary embodiments of the present invention, examples of which are illustrated in the accompanying drawings, wherein like reference numerals refer to the like elements throughout. The exemplary embodiments are described below in order to explain the present invention by referring to the drawings.

A broadcast method in a wireless network according to exemplary embodiments of the present invention utilizes a link-based broadcast rather than a parent node and child node relationship which is based on a tree-based broadcast. Accordingly, the parent node and the child node relationship which is based on the tree structure are not the only nodes that can participate in the delivery of broadcast packets. In other words, all nodes can participate in the delivery of broadcast packets according to the broadcast method of the present invention. The broadcast method in the wireless network according to the present invention is primarily applied to a ZigBee network compliant to the IEEE 802.15.4 standard However, the broadcast method according the present invention is not limited to the ZigBee network. For instance, any network meeting the criteria corresponding to embodiments of the present invention may be employed.

Figure 5A:
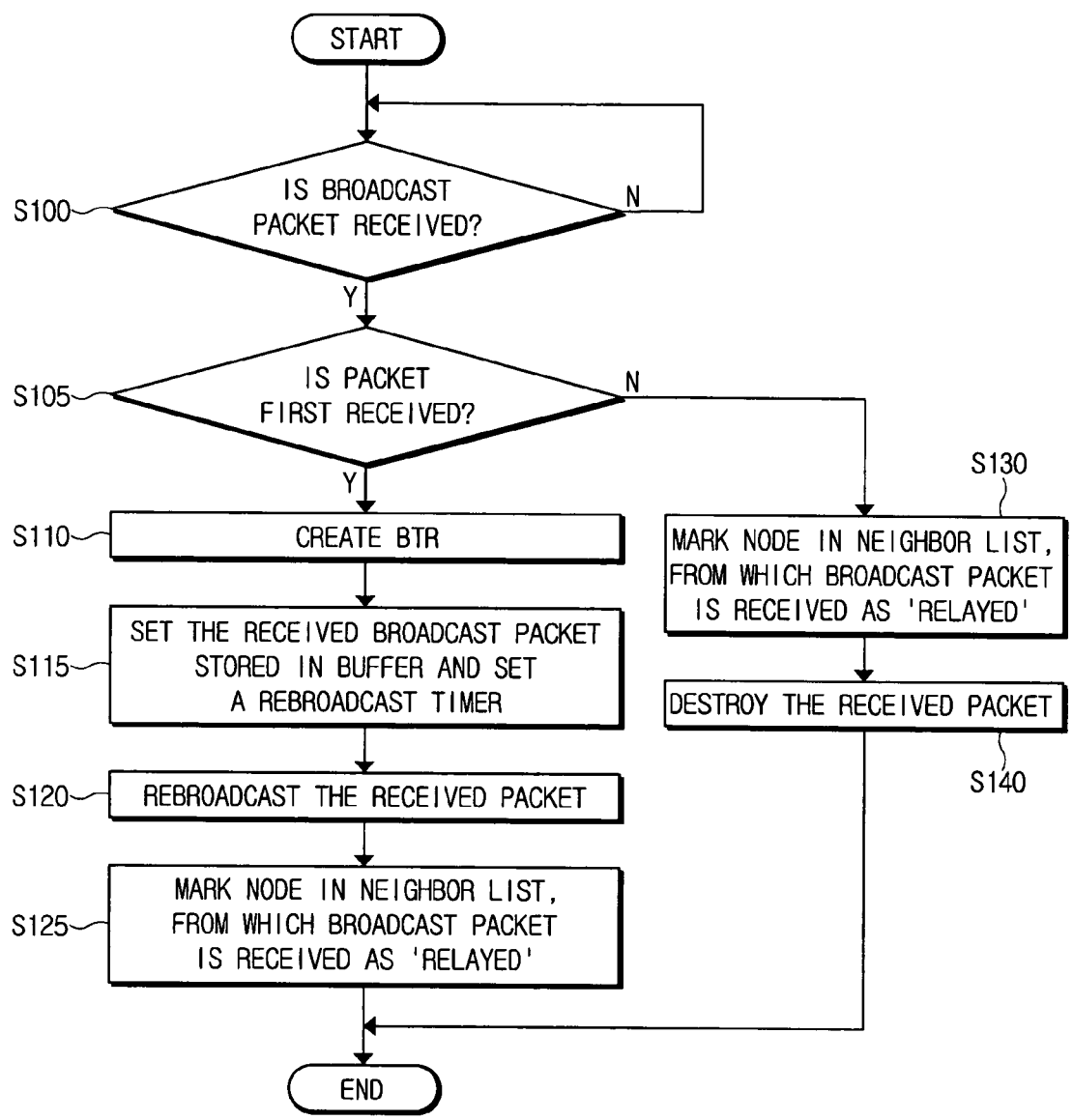
FIGS. 5A and 5B are flowcharts of a broadcast method according to a first embodiment of the present invention.
Figure 5B:
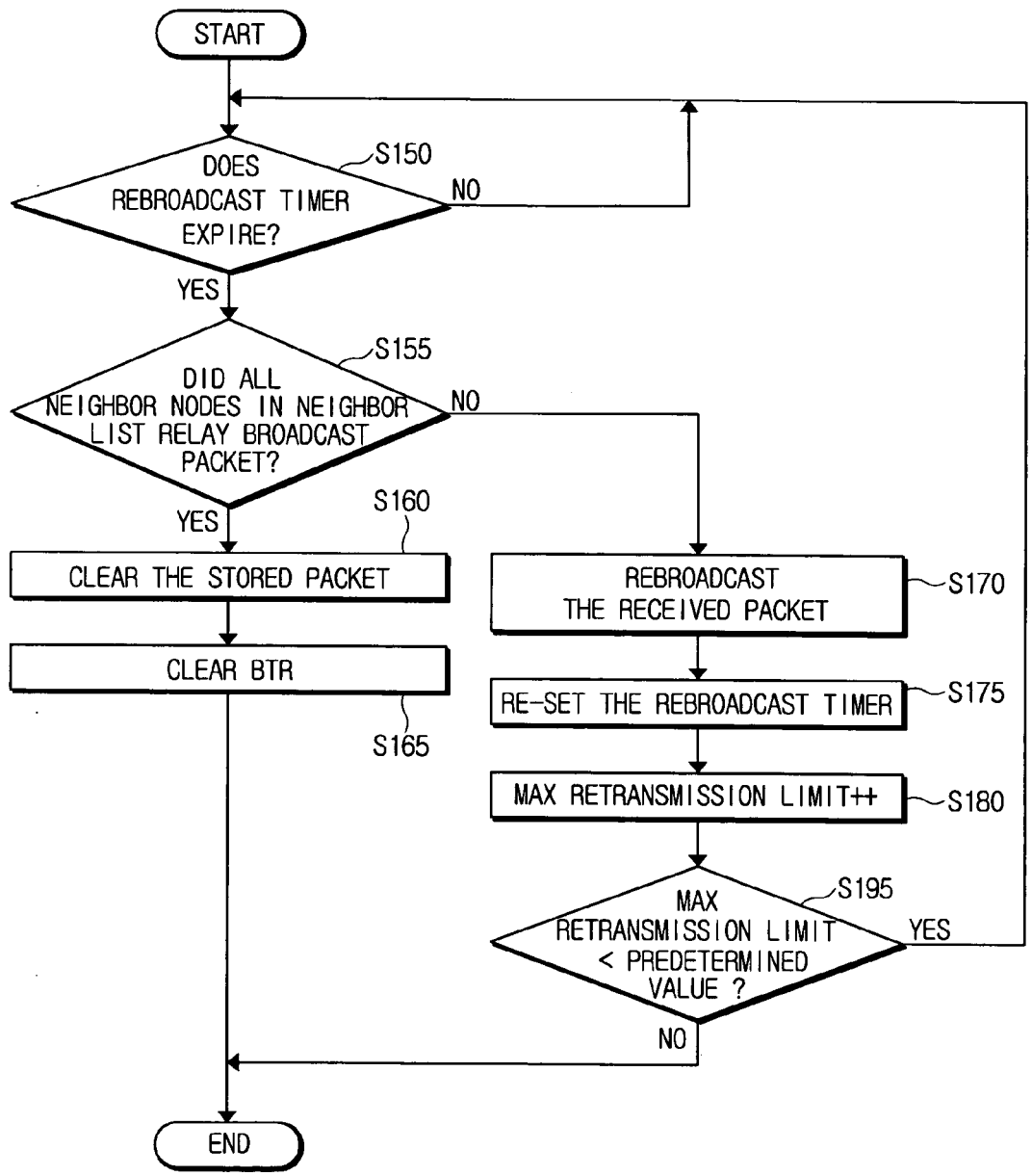

FIGS. 5A and 5B are flowcharts of the broadcast method in the wireless network according to a first embodiment of the present invention. Referring initially to FIG. 5A, a node linked to the wireless network receives a broadcast packet (S100), and the node determines whether the received packet is first received (S105). The first received packet denotes that the received packet is not the same as a previously received packet. A determination is made as to whether the packet is first received by checking the presence of packet information corresponding to the received packet in a broadcast transaction record (BTR) of a broadcast transaction table (BTT).

If the determination performed at step S105 reveals that the packet is first received, a BTR corresponding to the received packet is created and stored in the BTT (S110). The BTR created corresponding to the received packet contains a source address and a broadcast sequence number (BCSN) of the packet.

After creating the BTR, the received broadcast packet is stored in a buffer and a rebroadcast timer is set (S115). The rebroadcast timer is used to determine a rebroadcast time. Subsequently, the received packet is rebroadcast at step S120.

Figure 6:
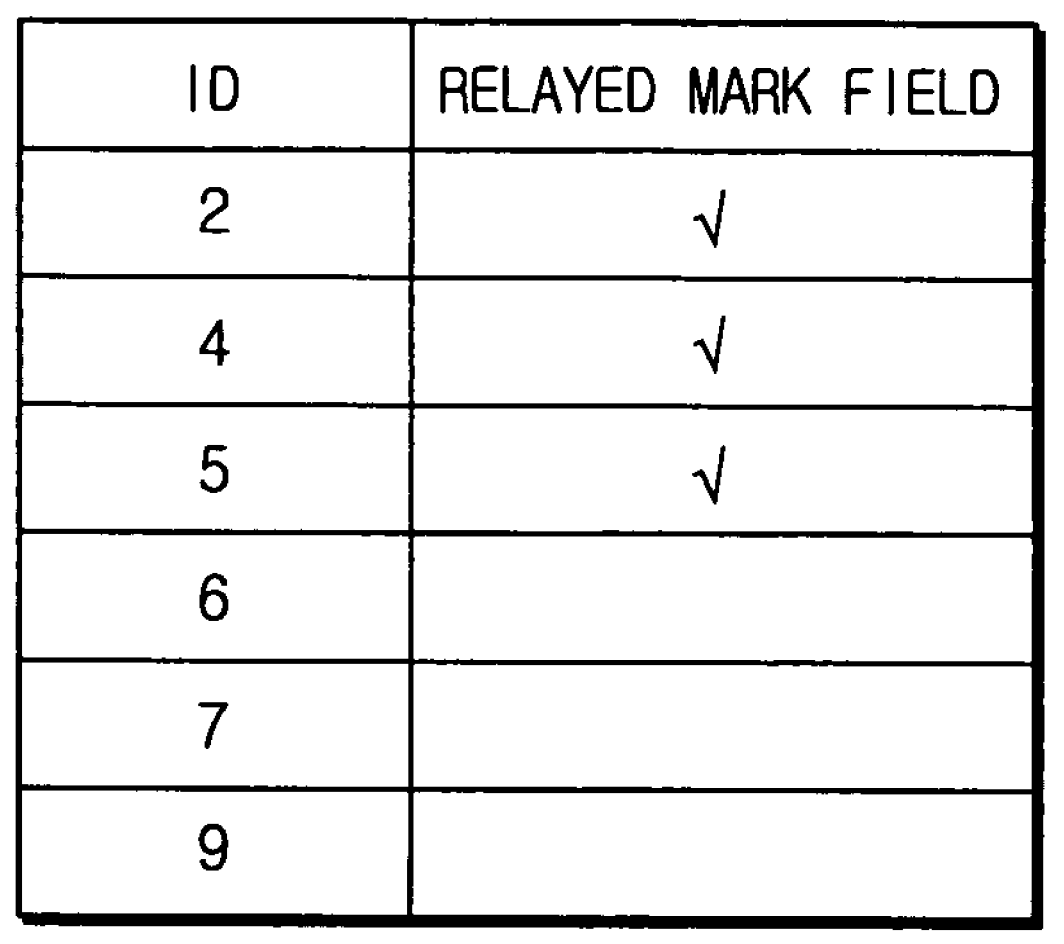

In step S125, each of the neighbor nodes in the neighbor list from which the broadcast packet is received are checked and marked as 'relayed', as shown in FIG. 6. According to the present invention, the neighbor list organizes information relating to neighbor nodes within one hop from a broadcast source. In order to mark a relayed field of the neighbor list a bitmap based on an index of each node is utilized. The length of the bitmap equals the number of neighbor nodes in the neighbor list.

If it is determined at step S105 that the packet has been received, each of the neighbor nodes in the neighbor list from which the broadcast packet is received are checked and marked as 'relayed' when the source address of the received packet corresponds to the neighbor nodes in the neighbor list (S130). After the neighbor nodes in the neighbor list are marked as 'relayed' in step S130, the received packet is destroyed in step S140. As a result, the received broadcast packet is processed.

Referring to FIG. 5B, when the set rebroadcast timer expires after a predetermined time (S150), a determination is made as to whether all of the neighbor nodes in the neighbor list are marked as 'relayed' (S155). If the determination reveals that each of the neighbor nodes are not marked as 'relayed', the received packet is rebroadcast in step S170 and the rebroadcast timer is re-set in step S175. A Maximum Retransmission Limit parameter to count the number of times rebroadcast has occurred is increased (S180). If the Maximum Retransmission Limit parameter is below a predetermined value (S195), steps S150 through S180 are repeated. Accordingly, the number of the times rebroadcast may occur is limited to the predetermined value. As a result, unrestricted rebroadcast is not allowed.

If all of the neighbor nodes in the neighbor list are marked as 'relayed' at step S155, the packet stored in the buffer is cleared (S160) and the BTR is cleared (S165). In other words, the packet is destroyed when all of the neighbor nodes from which the packet is received are marked as 'relayed'. As a result, it is guaranteed that all the neighbor nodes receive the broadcast packet according to the link-based broadcast.

A broadcast method according to a second embodiment of the present invention selectively utilizes a reliable broadcast method and an unreliable and best-effort broadcast. According to the second embodiment of the present invention, an 'Unreliable Broadcast' field is newly defined, and the broadcast method is selected depending on whether the 'Unreliable Broadcast' field is set. For example, if the 'Unreliable Broadcast' field is not set, the broadcast method using the neighbor list according to the first embodiment of the present invention is used. In other words, when the 'Unreliable Broadcast' field is not set, the reliable broadcast method rebroadcasts the broadcast packet if the broadcast packet is first received, and rebroadcasts the broadcast packet after a predetermined time if there is a node, among the neighbor nodes listed in the neighbor list, which does not relay the broadcast packet. If the packet is not first received, the reliable broadcast method destroys the broadcast packet. On the contrary, if the 'Unreliable Broadcast' field is set, the broadcast packet is not forwarded according to the reliable method as in the first embodiment of the present invention. Instead, according to the unreliable broadcast method, the broadcast packet is forwarded if the packet is first received and the broadcast packet is destroyed if the broadcast packet is not first received. Additionally, when the 'Unreliable Broadcast' field is set, the creation of the BTR is maintained. However, marking of the corresponding neighbor node in the neighbor list as 'relayed' is not utilized.

Figure 7:
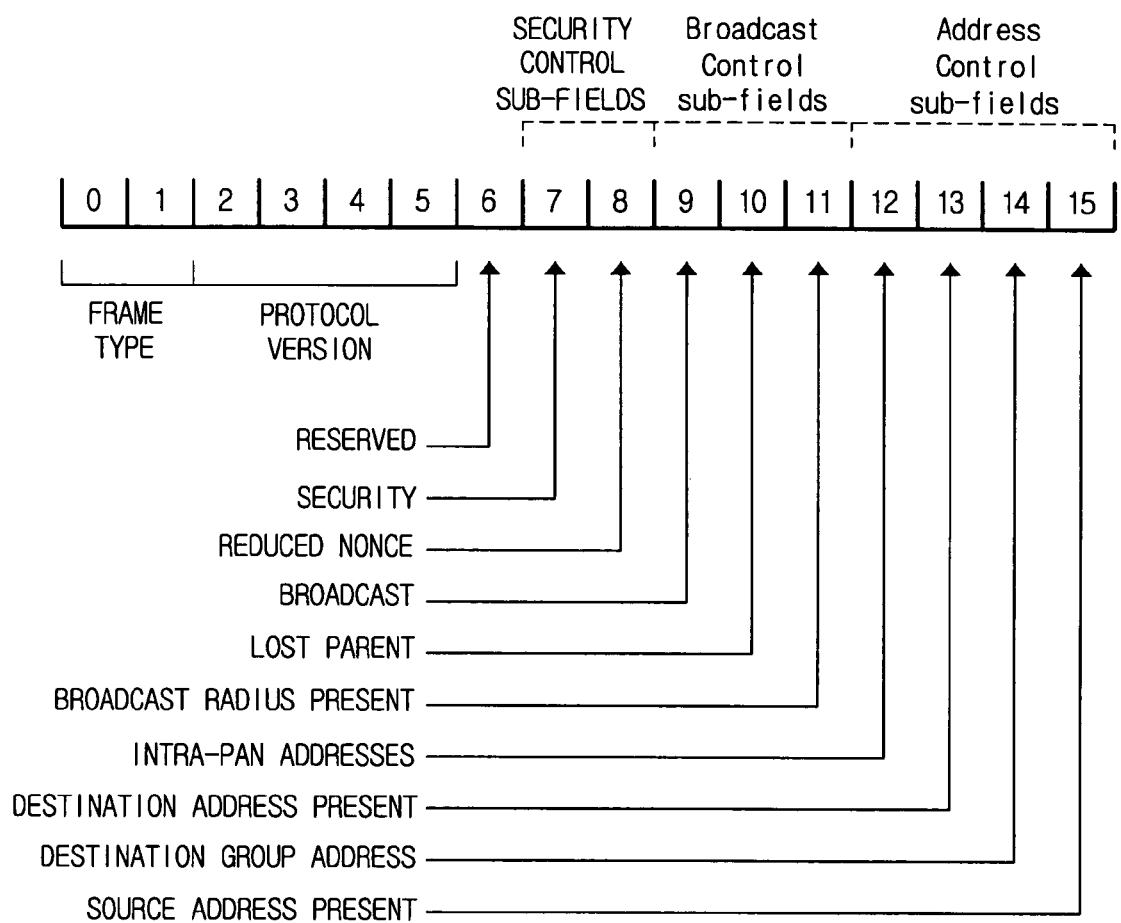
FIG. 7 is a diagram of an exemplary embodiment of a packet control field.

Referring to FIG. 7, the 'Unreliable Broadcast' field can use a 'Lost Parent' field in a packet control field which is added into a header at a network layer. A 'Broadcast' bit, a 'Lost Parent' bit, and a 'Broadcast Radius Present' bit in the packet control field respectively relate to the network-wide broadcast, the local broadcast repair, and the limited radius broadcast of the ZigBee specification. As described above, broadcast method according to the exemplary embodiments of the present invention allows all nodes to participate in the forwarding of the broadcast packet. Thus, there is no need to utilize the local broadcast repair to find the link to the parent node. Accordingly, the 'Lost Parent' field can be used as the 'Unreliable Broadcast' field.

A broadcast method according to a third embodiment of the present invention selectively utilizes tree-based and link-based limited radius broadcasts. To this end, a 'Tree-based Broadcast' sub-field is added in the header of a packet control field. By default, the 'Tree-based Broadcast' sub-field is not set, and the link-based limited radius broadcast according to the first embodiment of the present invention is utilized. However, if the 'Tree-based Broadcast' sub-field is set, the tree-based limited radius broadcast is utilized according to the conventional broadcast methods of the ZigBee specification.

When building a neighbor list which includes information regarding the nodes within one hop from a broadcast source, it is possible to group the nodes based on the parent and child relationship by using a ZigBee address.

Figure 8:
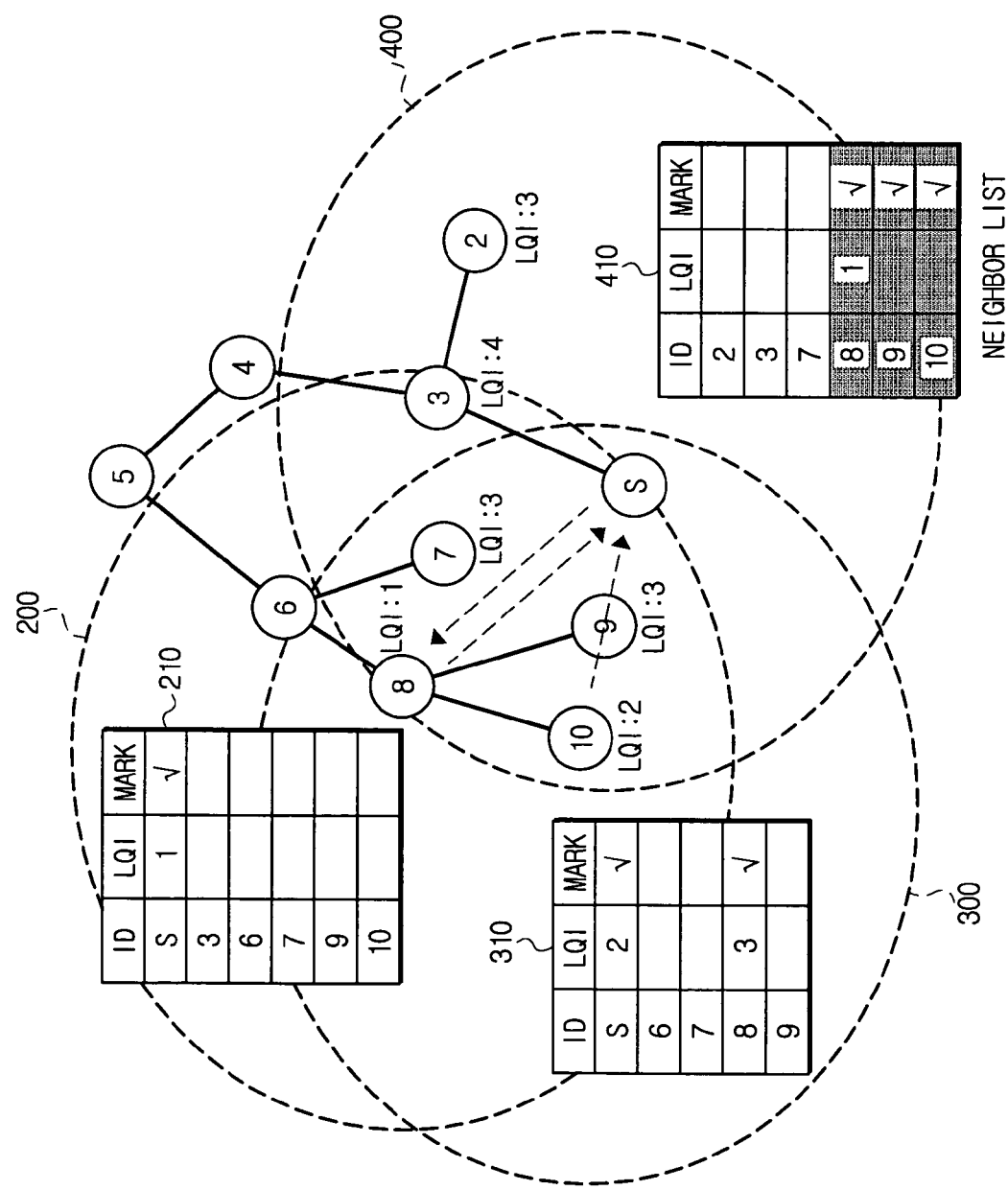
FIG. 8 is a diagram illustrating that a neighbor list is built by grouping neighbor nodes.

FIG. 8 illustrates that a neighbor list is built by grouping neighbor nodes. Referring to FIG. 8, the first to third neighbor lists 210, 310 and 410 are built for the first to third areas 200, 300 and 400, respectively. Nodes 6 and 7 are in the parent and child relationship in the first and second neighbor lists 210 and 310. Nodes 8, 9, and 10 are in the parent and child relationship in the third neighbor list 410.

After grouping the neighbor nodes in the parent and child relationship, and once the broadcast packet is received from one of the nodes in a specific group, all nodes in the corresponding group are checked and marked as 'relayed' according to the normal reception of the broadcast packet in the neighbor list. Nodes in a group, which share a superframe, enable reliable transmission within the group. In addition, waiting time at a source node is reduced.

When determining a rebroadcast time, the received broadcast packet may be rebroadcast to nodes in an order corresponding to the distance away from the source node by setting a backoff value in proportion to a link quality indicator (LQI) value of the received broadcast packet. In this situation, if the rebroadcast packet generated at the node farthest from the source node is received, the nodes close to the source node receive the packet in the usual manner. Since the node farthest from the source node performs the rebroadcast, high-speed broadcast can be performed over the entire network.

In light of the foregoing, each of the nodes linked to a wireless network can participate in the forwarding of the broadcast packet according to the link-based broadcast.

Since the broadcast packet is delivered along the links, the broadcast packet is performed faster than the tree-based broadcast.

The tree structure is not utilized according to the embodiments of the present invention, and therefore, the local broadcast repair mechanism to repair the tree structure is not needed.

Since the link-based limited radius broadcast is utilized, it is possible to efficiently set the transmission range of the broadcast packet, and the RC value represents the actual limited hop.

If needed, it is possible to selectively utilize the reliable broadcast and the unreliable and best-effort broadcast.

The rebroadcast time can be efficiently set by grouping the neighbor list by use of the ZigBee address, or, according to the LQI value.

While the exemplary embodiments of the present invention have been described, additional variations and modifications of the exemplary embodiments may occur to those skilled in the art once they learn of the basic inventive concepts. Therefore, it is intended that the appended claims shall be construed to include the aforementioned exemplary embodiments and all such variations and modifications that fall within the spirit and scope of the invention.

What is claimed is:

1. A broadcast method in a wireless network comprising the steps of:
   receiving a broadcast packet;
   determining whether the broadcast packet is first received;
   storing the broadcast packet and rebroadcasting the broadcast packet to neighbor nodes when the broadcast packet is first received;
   destroying the broadcast packet when the broadcast packet is not first received;
   marking a node, among the neighbor nodes, from which the broadcast packet is received as 'relayed';
   checking whether all of the neighbor nodes are marked as 'relayed' after a predetermined time; and
   rebroadcasting the broadcast packet when all of the neighbor nodes from which the broadcast packet is received are not marked as 'relayed'.

2. The broadcast method of claim 1, wherein the first received packet is a received packet that is not the same as a previously received packet.

3. The broadcast method of claim 1, further comprising the step of destroying the broadcast packet when all of the neighbor nodes from which the broadcast packet is received are marked as 'relayed'.

4. The broadcast method of claim 1, wherein a rebroadcast timer counts the predetermined time, thereby setting a rebroadcast time.

5. The broadcast method of claim 1, wherein the predetermined time is set based on a link quality indicator (LQI) value of the received broadcast packet.

6. The broadcast method of claim 1, wherein the rebroadcast step is repeated a number of times corresponding to a predetermined value, at intervals of the predetermined time until all of the neighbor nodes relay the broadcast packet.

7. The broadcast method of claim 1, wherein the wireless network is a ZigBee network compliant to the IEEE 802.15.4 standard.

8. The broadcast method of claim 7, wherein the marking step sets a neighbor list corresponding to information relative to the neighbor nodes, and marks the nodes listed in the neighbor list.

9. The broadcast method of claim 8, wherein the neighbor list is set using a bitmap based on an index of the listed neighbor nodes.

10. The broadcast method of claim 8, wherein the listed neighbor nodes are located within one hop from a broadcast source.

11. The broadcast method of claim 8, wherein the listed neighbor nodes are grouped based on a ZigBee address, and the grouped neighbor nodes are checked to determine whether the grouped neighbor nodes are marked as 'relayed'.

12. A broadcast method in a wireless network, comprising the steps of:
   receiving a broadcast packet;
   determining whether a designated field in a header of the broadcast packet is set;
   rebroadcasting the broadcast packet according to a reliable broadcast method when the designated field is set; and
   rebroadcasting the broadcast packet according to a unreliable broadcast method when the designated field is not set,
   wherein the reliable broadcast method comprises:
      marking a node, among neighbor nodes, from which the broadcast packet is received as 'relayed';
      checking whether all of the neighbor nodes are marked as 'relayed' after a predetermined time; and
      rebroadcasting the broadcast packet when all of the neighbor nodes from which the broadcast packet is received are not marked as 'relayed'.

13. The broadcast method of claim 12, wherein the wireless network is a ZigBee network compliant to IEEE 802.15.4.

14. The broadcast method of claim 13, wherein the reliable broadcast method rebroadcasts the broadcast packet if the broadcast packet is first received, and rebroadcasts the broadcast packet after a predetermined time if there is a node, among neighbor nodes, which is not marked as 'relayed', and
   wherein the reliable broadcast method destroys the broadcast packet if the packet is not first received.

15. The broadcast method of claim 13, wherein the unreliable broadcast method rebroadcasts the broadcast packet if the broadcast packet is first received, and destroys the broadcast packet if the broadcast packet is not first received.

16. The broadcast method of claim 13, wherein the designated field is a 'Lost Parent' field in a packet control field included in the header of the broadcast packet.

17. A communication apparatus using a broadcast method in a wireless network, comprising:
   a means for receiving a broadcast packet;
   a means for determining whether the broadcast packet is first received;
   a means for storing and rebroadcasting the broadcast packet to neighbor nodes if the broadcast packet is first received;
   a means for destroying the broadcast packet if the broadcast packet is not first received;
   a means for marking a node, among the neighbor nodes from which the broadcast packet is received, as 'relayed';
   a means for checking whether all of the neighbor nodes are marked as 'relayed' after a predetermined time; and
   a means for rebroadcasting the broadcast packet if all of the neighbor nodes are not marked as 'relayed'.

18. The communication apparatus of claim 17, further comprising a means for destroying the broadcast packet if all of the neighbor nodes are marked as 'relayed'.

* * * * *